United States Patent [19]
Shah

[11] Patent Number: 5,889,355
[45] Date of Patent: *Mar. 30, 1999

[54] SUPPRESSION OF GHOST IMAGES AND SIDE-LOBES IN ACOUSTO-OPTIC DEVICES

[75] Inventor: Manhar L. Shah, Melbourne, Fla.

[73] Assignee: MVM Electronics, Inc., Melbourne, Fla.

[*] Notice: This patent issued on a continued prosecution application filed under 37 CFR 1.53(d), and is subject to the twenty year patent term provisions of 35 U.S.C. 154(a)(2).

[21] Appl. No.: 709,304

[22] Filed: Sep. 9, 1996

[51] Int. Cl.$^6$ .................................... H01L 41/08
[52] U.S. Cl. ............................................. 310/334
[58] Field of Search ........................... 310/334–337, 310/365–368

[56] References Cited

U.S. PATENT DOCUMENTS 4,425,525  1/1984  Smith et al. .................. 310/367 X
5,115,810  5/1992  Watanabe et al. ............. 310/334 X

*Primary Examiner*—Mark O. Budd
*Attorney, Agent, or Firm*—Law Offices of Brian S. Steinberger

[57] ABSTRACT

Acousto-optic(AO) devices having a sectioned optical transducer with a side passing optical beam forming an acousto-optic interaction plane, an electrode pattern on the transducer, and oblique demarcation cuts in the electrode pattern which are not normal to the acousto-optic interaction plane. The oblique cuts are at an angle oriented between 5 to 85 degrees, preferably approximately 45 degrees, with respect to the normal to the acousto-optic interaction plane. The oblique demarcation cuts eliminate side-lobes and ghost images in an acoustic field generated by the transducer. The electrode pattern shapes can be diamond, a truncated Gaussian, cosine, square, rectangular, circular, and elliptical. Acousto-Optic Modulators (AOMs). The types of AO devices include: Acousto-Optic Beam Deflectors (AOBDs), Bragg Cells (BCs), Acousto-Optic Tunable Filters (AOTFs), Acousto-Optic Frequency Shifters (AOFSs), and Acoust-Optic Correlators (AOCs).

13 Claims, 8 Drawing Sheets

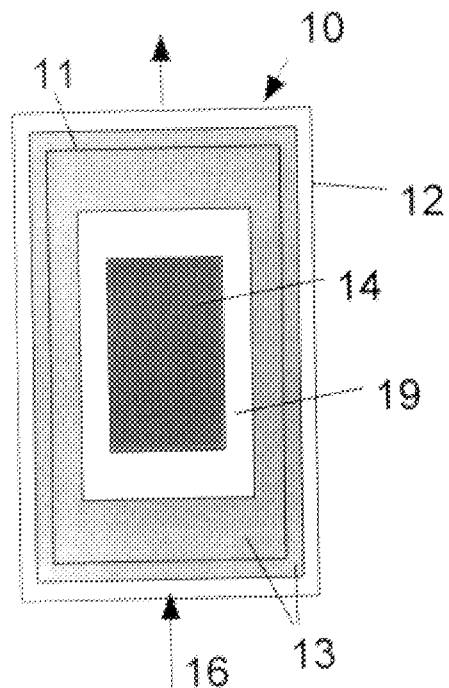
Fig. 1 (a) (Prior Art)
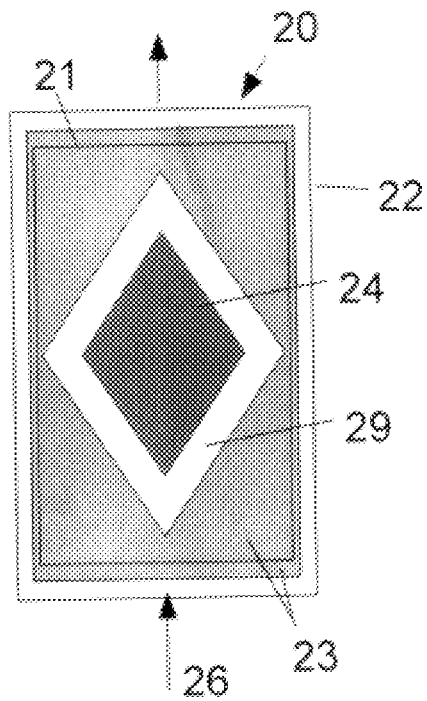
Fig. 1 (b) (Prior Art)
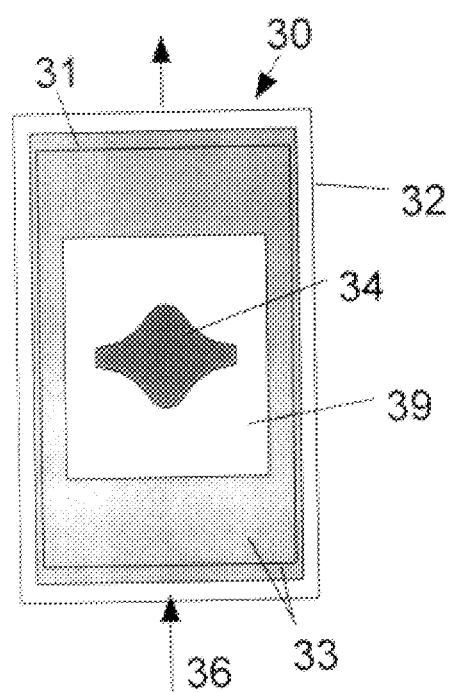
Fig. 1 (c) (Prior Art)
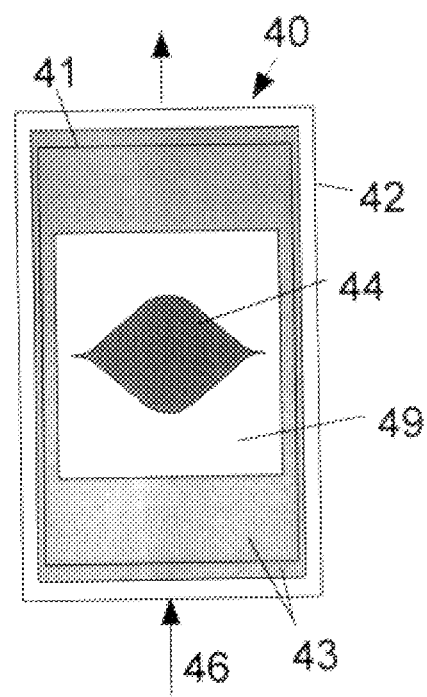
Fig. 1 (d) (Prior Art)

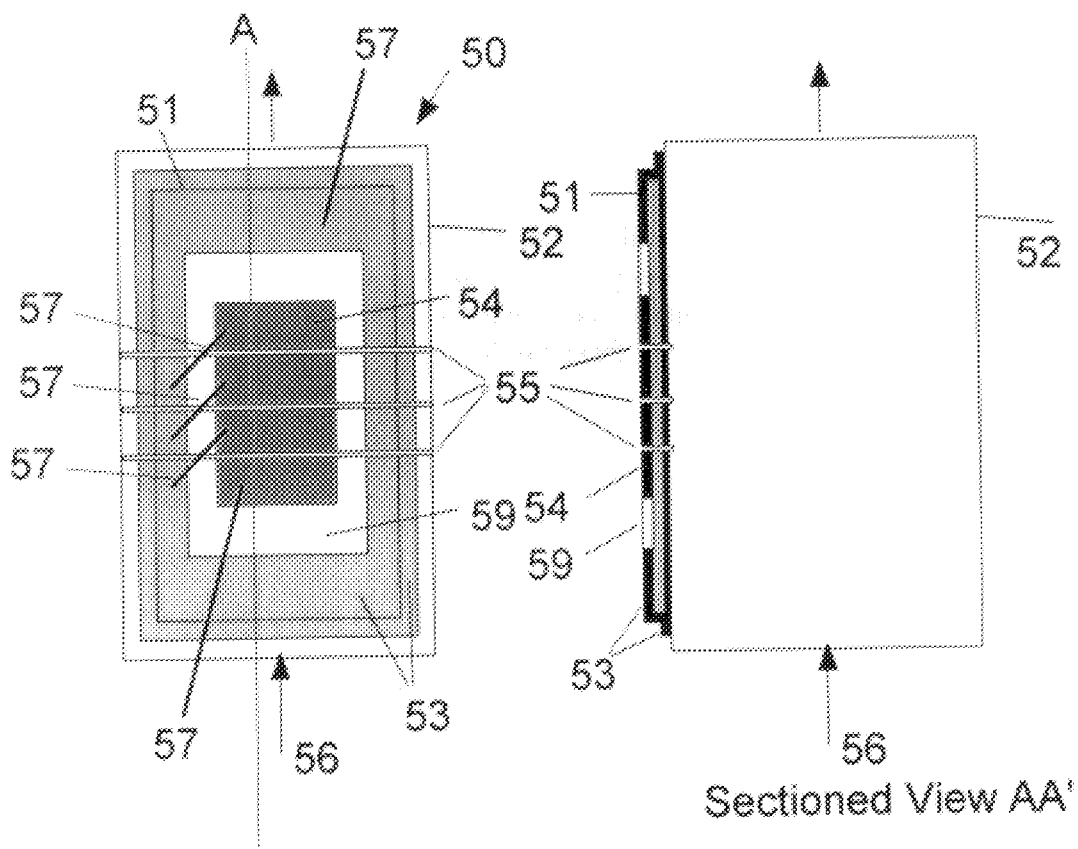
Fig. 2 (a) (Prior Art)    Fig. 2 (b) (Prior Art)

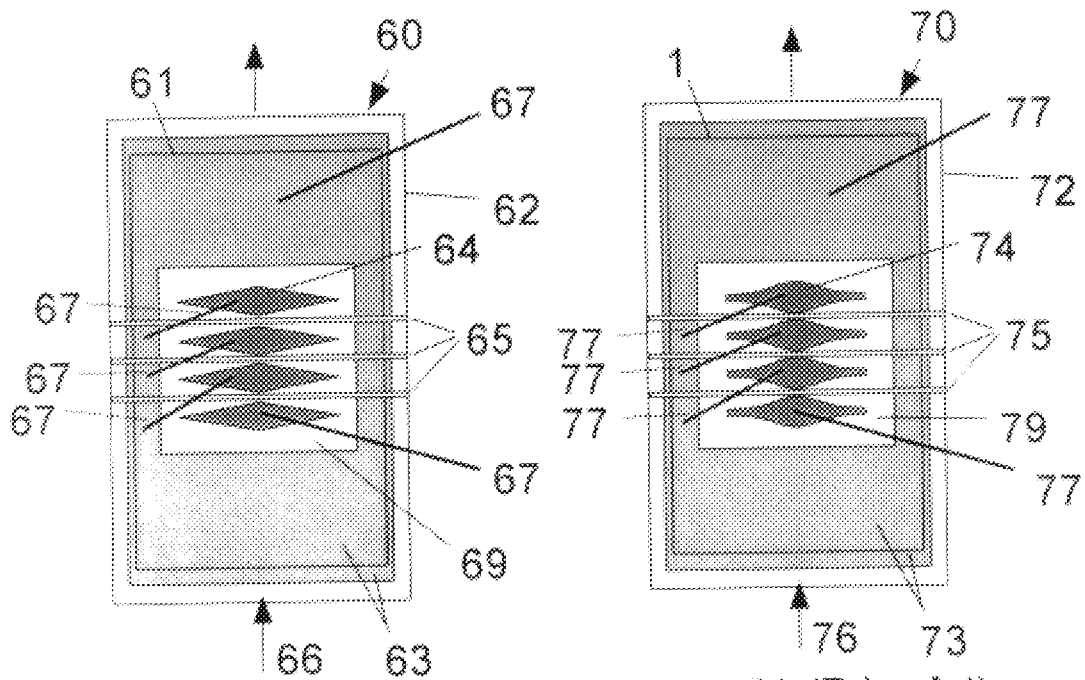
Fig. 3 (a) (Prior Art)    Fig. 3 (b) (Prior Art)
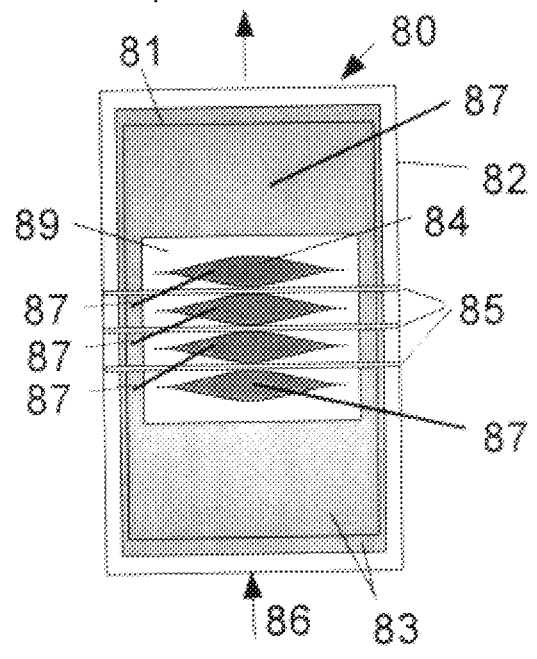
Fig. 3 (c) (Prior Art)

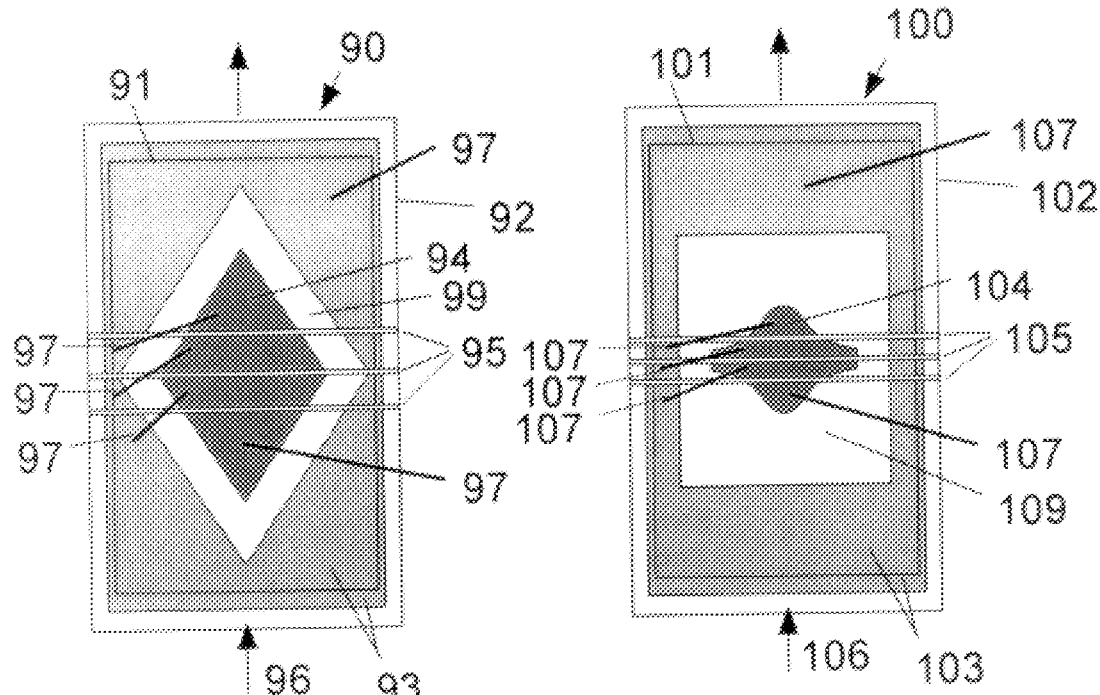
Fig. 4 (a) (Prior Art)
Fig. 4 (b) (Prior Art)
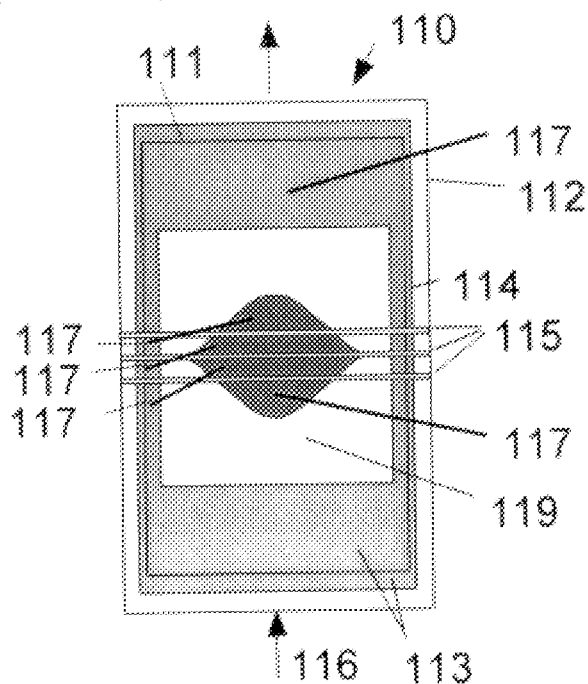
Fig. 4 (c) (Prior Art)

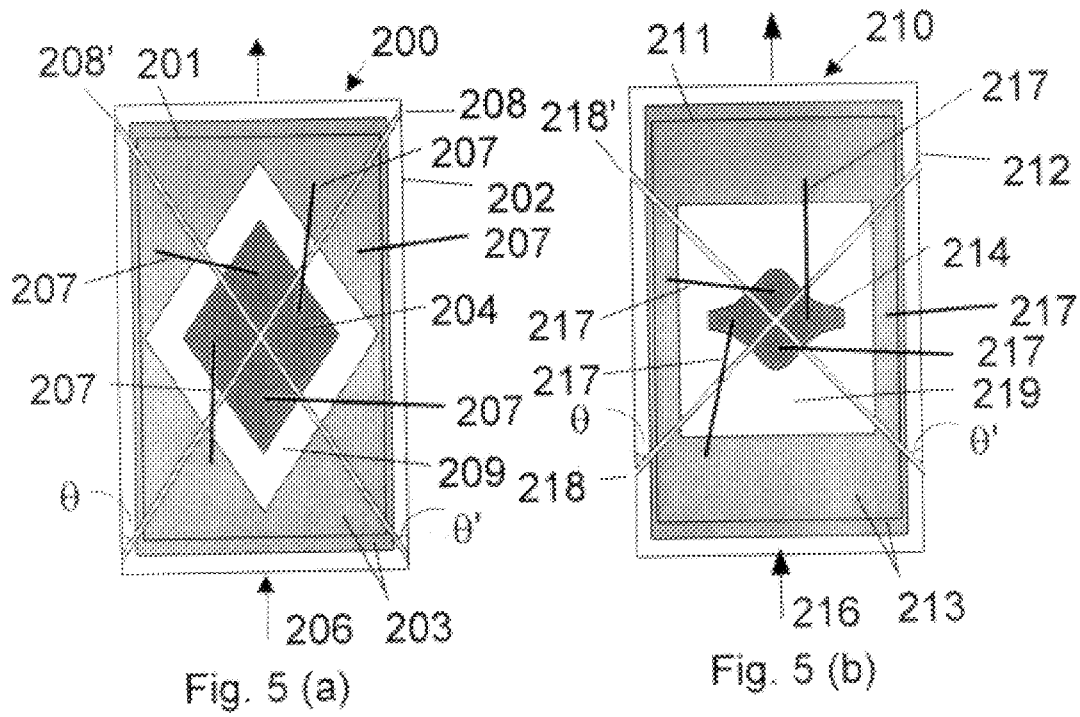
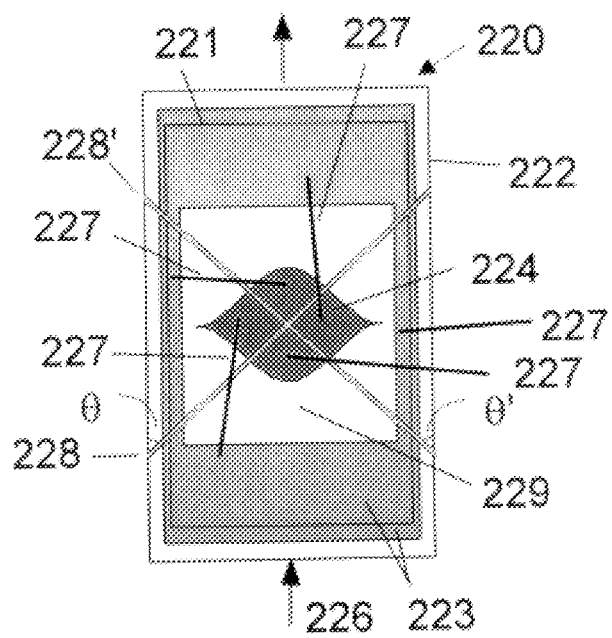

SUPPRESSION OF GHOST IMAGES AND SIDE-LOBES IN ACOUSTO-OPTIC DEVICES

This invention relates to a method of reducing or suppressing the ghost images and side-lobes in Acousto-Optic (AO) devices and particularly in Acousto-Optic Tunable Filters (AOTFs). In particular this invention describes a method for improving the spectral, temporal and spatial resolution parameters of the AO devices using oblique demarcations or cuts for producing plurality of sections of piezoelectric transducer to achieve suppression of the ghost images or side-lobes. Series connection of these sections results in better impedance matching and easier device construction. This invention was funded by the National Aeronautics and Space Administration, Jet Propulsion Laboratory under SBIR contract number NAS7-1311.

BACKGROUND AND PRIOR ART

The Acoustic beam profile or shape in an Acousto-Optic (AO) device is defined by the electrode pattern on a piezoelectric transducer bonded to the device body. The radiation pattern from common rectangular shaped piezoelectric transducers produces SINC function, $[\sin(2\theta)/(\theta)]^2$, pattern in the interaction plane, where $\theta$ is the angle from transducer normal in the AO interaction plane. This SINC function pattern has extensive side-lobe structure. The diffraction of light from an AO device can be considered to take place from the angular spectral distribution of the transducer radiation in the AO interaction plane. See Adrian Korpel, "ACOUSTO-OPTICS", Marcel Dekker, Inc., New York, pp. 77–93, 1988. The acoustic side-lobes generated due to the transducer geometry, manifest through AO interaction as ghost images when an image is formed or as some structure, known as side-lobe, in spatial, temporal or frequency domain depending upon the AO device application. The SINC function radiation pattern from a rectangular transducer can be mathematically predicted from the spatial Fourier transform theory, See John N. Lee, Editor, "Design Issues in Optical Processing", Cambridge University Press, pp. 78–136, 1995. The effect of any discontinuity in the transducer pattern on the image and side-lobe performance of an AO device can be similarly predicted using spatial Fourier transform of the discontinuity. If a discontinuity causes a side-lobe in the acoustic radiation pattern in the AO interaction plane then a ghost image can occur in an AO device for imaging application or side-lobe may occur in spatial, temporal or frequency domain depending upon the AO device application.

The relation between optical diffraction pattern and transducer geometries in AO devices has been extensively analyzed and reported. See Dennis R. Pape, Peter A. Wasilousky, and Mike Krainak, "A high performance apodized phased array Bragg cell", SPIE Vol. 789 Optical Technology for Microwave Applications III, p116, 1987. When a rectangular transducer as shown in FIG. 1a is replaced with one of the commonly used apodized transducers as shown in FIGS 1b, 1c, and 1d then side-lobes in the acoustic radiation pattern are reduced or suppressed. The apodized transducers have edges oriented away from the normal to the AO interaction plane. This orientation produces Fourier components due to the edge discontinuity out of the interaction plane having large Bragg mismatch and hence absence of optical diffraction from the edge and discontinuity effects.

We have built AOTFs(Acousto-Optic Tunable Filters) with diamond shaped apodized transducers as shown in FIG. 1b and obtained images with negligible ghost images. On the other hand an AOTF with rectangularity shaped transducer produces severe ghost images. Ghost images severely degrade the spatial and spectral resolution of an AOTF based imager. A ghost free image is desirable in an AOTF based imager. Therefore, apodized transducer is commonly required for most AOTFs.

An improvement in the AOTF spatial resolution is possible with a larger optical aperture. However, a larger aperture AOTF requires larger transducer size. The radiation resistance of a piezoelectric transducer is inversely proportional to the area of piezoelectric transducer. A large transducer of an AOTF causes the radiation resistance to become quite small. The resistive part of practical reactive components used for impedance matching a large area AOTF transducer can become much larger than the radiation resistance in such a case. This results in significant reduction of the transducer bandwidth and electrical to acoustic conversion efficiency. A common technique to improve the bandwidth of a large area transducer is to section the transducer and connect the sections in series(See Joel F. Rsenbaum, "Bulk Acoustic Wave Theory and Devices", Artech House, Boston, Mass., p. 235, 1988) as shown in FIG. 2 for a rectangular transducer. A sectioning and series connection technique for improving the bandwidth of large area transducers which are encountered in the AOTF applications is shown in FIG. 3 as reported in Dennis R. Pape, Peter A. Wasilousky, and Mike Krainak, "A high performance apodized phased array Bragg cell", SPIE Vol. 789 Optical Technology for Microwave Applications III, p116, 1987, for the apodized transducers used in the prior art. Series connections of the transducer segments raises the transducer impedance value so that the impedance matching elements with high Q can be selected to allow a wider transducer bandwidth. Alternatively, sectioning of an apodized transducer for series connections can be accomplished in a similar manner with an equal area for each section as shown in FIG. 4a–4c.

Various patents relate to the subject invention but fail to obviate the problems previously discussed. See U.S. Pat. Nos. 4,348,609 and 4,760,358 to Inoue; 4,918,349 to Shiba et al.; 5,136,266 to Niitsuma; 5,155,406 to Cho et al.; and 5,369,382 to Arvanitis.

SUMMARY OF THE INVENTION

The first objective of the present invention is to describe a method of improving transducer impedance match by sectioning a transducer without introduction of ghost images due to the edge effect of the demarcations and cuts made to section the transducer.

The second object of this invention is to provide a ghost free narrow spectral band images with an AOTF and match the transducer impedance of the said AOTF over a wide RF excitation bandwidth thereby allowing a large operational spectral range for the system.

The third objective of the present invention is to reduce spatial, temporal or frequency domain side-lobes by the said oblique demarcations or cuts. In the prior art as shown in FIG. 4a–4c the transducer sections are produced with demarcations and cuts normal the AO interaction plane. The Fourier spectrum wave vectors of a demarcation or cut are directed normal to such demarcation or cut and, therefore in the AO interaction plane. Those wave vectors cause diffraction of light at certain interval of frequencies away from the Bragg matched center frequency. This diffracted output away from the center Bragg matched condition is referred as side-lobes and manifests as ghost image in a scene. In the subject invention the demarcation and cut lines are oriented away from the traditional near perpendicular orientation to the AO interaction plane. We call this orientation away from the perpendicular direction as "OBLIQUE" orientation. The Fourier components produced due to the discontinuity of the oblique demarcation or cut are significantly directed away from the optical propagation direction and cannot be Bragg matched. Large Bragg mismatch suppresses the light diffraction due to side-lobes in the oblique cut sections and suppresses the ghost images.

A fourth object of the present invention is to ease fabrication and reduce waste of the materials in construction of the AOTFs and AO devices. A prior art sectioning of a diamond shaped apodized AOTF transducer is shown in FIG. 4a and requires smaller lengths for the sections in the center of the transducer to provide equal area for each section. Moreover, the height of the center regions of the diamond is large, therefore, these sections reach near the edges of the AO device such as an AOTF. Very little ground electrode area is left for the sections near the center of the transducer. The device height needs to be increased to provide good electrical connections to the ground side of the sections near the center of the transducer. Additional height of the device does not contribute in improving the performance of the device and the material is simply wasted. On the other hand, oblique sectioning of the diamond shaped transducer provides good distribution of grounding electrode for each section as shown in FIG. 5a. In addition the number of demarcations or cuts with the oblique sectioning are reduced. The cost of fabrication of the AO devices with oblique sections is reduced due to smaller number of demarcations or cuts and easier ground connections.

The prior art sectioning of a diamond shaped transducer produces a large inequality of transducer area because it is more sensitive to the placement of the demarcation or cut near the center of the transducer. In prior art demarcation or cut for the diamond, the transducer area is proportional to the square of the distance of the demarcation or cut from the corner. In the oblique sectioning of the subject invention, the transducer area is proportional to the distance of the demarcation or cut from the edge, making the section area less sensitive to the error in the placement of the demarcation or cut.

We have built several AOTFs with a diamond shaped transducer without any sectioning and have confirmed the absence of ghost images. However, the transducer impedance was not matched well. The transducer was sectioned in a manner similar to the prior art as shown in FIG. 4a to improve the transducer bandwidth. Ghost images, absent in an AOTF with a single diamond shaped transducer, reappeared with the diamond shape sections according to FIG. 4a. We investigated the causes of the reappearance of the ghost images. We found that the sectioning introduced several sharp edged discontinuity having Fourier components similar to a rectangular transducer which resulted in side-lobes and ghost images similar to a rectangular shaped transducer.

Fourier theory and space harmonics in mathematics suggests that the wave vectors representing the space-harmonics components are directed normal to the sectioning lines or edges of the transducer. For this reason, a rectangular transducer geometry producing ghost images in the optical diffraction direction cannot be eliminated. A diamond shaped transducer has the space harmonics wave vector directed normal to the edge in a similar manner to the rectangular transducer. However, the normal to edges of diamond forms a large angle with the optical beam propagation direction. This causes a large Bragg mismatch, therefore, the ghost images are suppressed. With a similar reasoning, sectioning apodized transducers at an oblique direction as shown in FIG. 5a–5c should direct the space-harmonics due to the edges away from the optical propagation direction, thereby, suppressing the ghost images. We have confirmed an absence of side-lobes in several AOTFs with sections according to FIG. 5a while presence of side-lobes in other AOTFs with sections according to FIG. 4a.

Further objects and advantages of this invention will be apparent from the following detailed description of a presently preferred embodiment which is illustrated schematically in the accompanying drawings.

BRIEF DESCRIPTION OF THE FIGURES

FIG. 1a is a top view of a prior art rectangular electrode pattern used in acousto-optics and AOTFs.

FIG. 1b is a top view of a prior art diamond electrode pattern used in acousto-optics and AOTFs.

FIG. 1c is a top view a prior art oblong electrode pattern used in acousto-optics and AOTFs.

FIG. 1d is a top view of another prior art electrode pattern used in acousto-optics and AOTFs.

FIG. 2a is a top view of a prior art sectioning and series connection of a rectangular shaped transducer used to improve the transducer bandwidth.

FIG. 2b is a cross-sectional view of FIG. 2a along arrow AA'.

FIG. 3a is a prior art sectioning for an apodized transducer electrode pattern used to reduce side-lobes and ghost image in the AO diffraction.

FIG. 3b is another prior art sectioning for an apodized transducer electrode pattern used to reduce side-lobes and ghost image in the AO diffraction.

FIG. 3c is another prior art sectioning for an apodized transducer electrode pattern used to reduce side-lobes and ghost image in the AO diffraction.

FIG. 4a is another prior art sectioning used for apodized transducer electrode patterns to reduce side-lobes and ghost image in the AO diffraction.

FIG. 4b is another prior art sectioning used for apodized transducer electrode patterns to reduce side-lobes and ghost image in the AO diffraction.

FIG. 4c is another prior art sectioning used for apodized transducer electrode patterns to reduce side-lobes and ghost image in the AO diffraction.

FIG. 5a is a top view of a first transducer sectioning according to the subject invention for reducing side-lobes and ghost image in the AO diffraction.

FIG. 5b is a top view of a second transducer sectioning according to the subject invention for reducing side-lobes and ghost image in the AO diffraction.

FIG. 5c is a top view of a third transducer sectioning according to the subject invention for reducing side-lobes and ghost image in the AO diffraction.

DESCRIPTION OF THE PREFERRED EMBODIMENT

Figure 6:
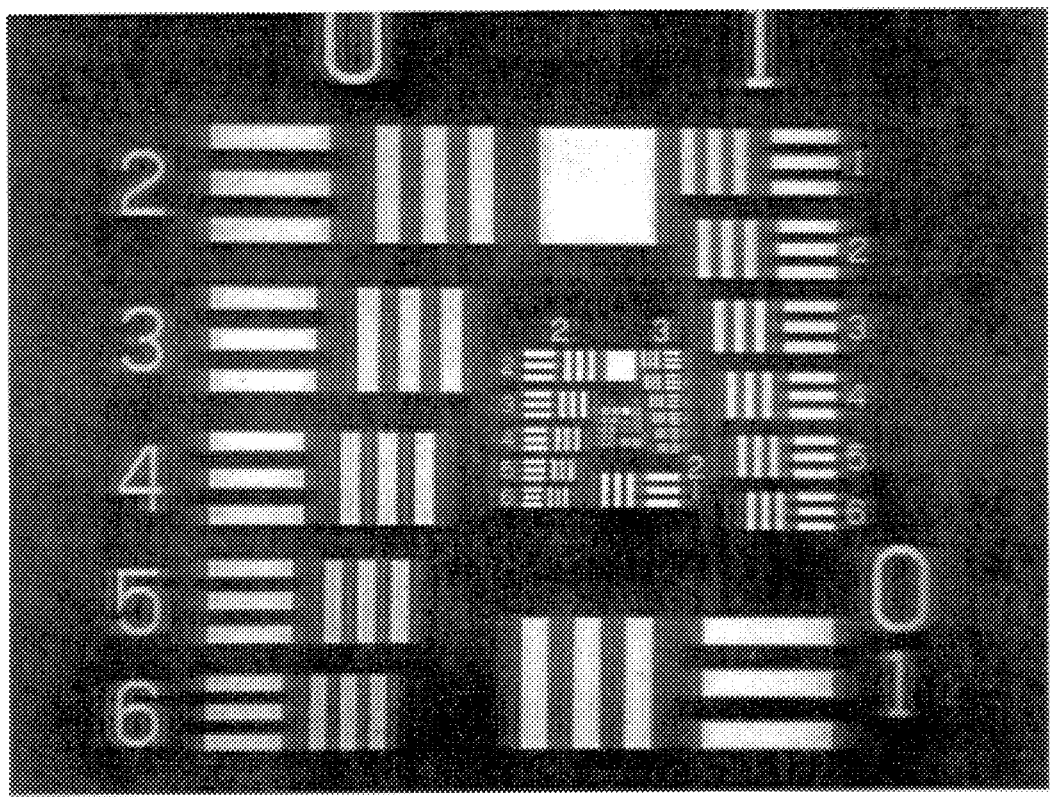
FIG. 6 shows an image of an Air Force test resolution chart with AOTFs with diamond shaped transducer sectioned and series connected according to FIG. 4a. Notice the presence of ghost images.

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

FIG. 1a is a top view of a prior art rectangular electrode pattern 10 used in acousto-optics and AOTF devices. A description of each of the components in FIG. 1a will now be described. Piezoelectric transducer 11 is bonded to an Acousto-Optic(AO) medium 12. Component 13 refers to a ground electrode or bottom electrode of the transducer 11. Component 13 refers to a top electrode or electrode pattern which defines the acoustic beam of transducer 11. Arrow 16 refers to the optical beam passing through the Acousto-Optic (AO) medium 12 to allow Acousto-Optic Interaction.

FIG. 1b is a top view of a prior art Diamond Apodized electrode pattern 20 used in acousto-optics and AOTF devices. Piezoelectric transducer 21 is bonded to Acousto-Optic(AO) Medium 22. Component 23 refers to a ground electrode or bottom electrode of the transducer 21. Component 24 refers to a top electrode or electrode pattern which defines the Acoustic beam of transducer 21. Arrow 26 is the optical beam passing through the AO medium 22 to allow Acousto-Optic Interaction.

FIG. 1c is a top view of a prior art Truncated Gaussian Apodized electrode pattern 30 used in acousto-optics and AOTF devices. Piezoelectric transducer 31 is bonded to an Acousto-Optic Medium 32. Component 33 refers to a ground electrode or bottom electrode of the transducer 31. Component 34 refers to a top electrode or electrode pattern which defines the acoustic beam of the transducer 31. Arrow 36 is the optical beam passing through the AO medium 32 to allow Acousto-Optic Interaction.

FIG. 1d is a top view of a prior art Cosine Apodized electrode pattern 40 used in acousto-optics and AOTF devices. Piezoelectric transducer 41 is bonded to an Acousto-Optic(AO) medium 42. Component 43 refers to the ground electrode or bottom electrode of the transducer 41. Component 44 refers to the top electrode or bottom electrode pattern which defines the acoustic beam of transducer 41. Arrow 46 is the optical beam passing through the AO medium 42 to allow Acoustic Interaction.

FIG. 2a is a top view 50 of a prior art sectioning and series connection of a rectangular shaped transducer used to improve the transducer bandwidth. FIG. 2b is a cross-sectional view of FIG. 2a along arrow AA'. Referring to FIGS. 2a–2b, piezoelectric transducer 51 is bonded to Acousto-Optic(AO) medium 52. Component 53 refers to a ground electrode or bottom electrode of the transducer 51. Component 54 refers to a top electrode or electrode pattern which defines the acoustic beam of transducer 51. Cut or demarcation lines 55 separate transducer 51 into sections. Arrow 56 is the optical beam passing through the AO medium 52 to allow Acousto-Optic interaction. Connection wire 57 is used to electrically join the sections of transducer 51 in series.

FIG. 3a is a top view 60 of a prior art sectioning and series connection of an apodized transducer used to reduce side-lobes and ghost images in AO diffraction, and to improve the transducer bandwidth. Piezoelectric transducer 61 is bonded to an AO medium 62. Component 63 refers to the ground electrode or bottom electrode of the transducer 61. Component 64 refers to the top electrode or electrode pattern which defines the acoustic beam of the transducer. Cut or demarcation lines 65 separate transducer 61 into sections. Arrow 66 is the optical beam passing through the AO medium 62 to allow Acousto-Optic Interaction. Connection wires 67 are used to electrically join the sections of the transducer 61 in series.

FIG. 3b is a top view of another prior art sectioning and series connection of an apodized transducer used to reduce side-lobes and ghost images in AO diffraction, and improve transducer bandwidth. Piezoelectric transducer 71 is bonded to AO medium 72. Component 73 refers to a ground electrode or bottom electrode of the transducer 71. Component 74 refers to the top electrode or electrode pattern which defines the acoustic beam of transducer 71. Cut or demarcation lines 75 separate transducer 71 into sections. Arrow 76 is the optical beam passing through the AO medium 72 to allow Acousto-Optic Interaction. Connection wires 77 electrically join the sections of transducer 71 in series.

FIG. 3c is a top view 80 of another prior art sectioning and series connection of an apodized transducer used to reduce side-lobes and ghost images in the AO diffraction, and improve the transducer bandwidth. Piezoelectric transducer 81 is bonded to AO medium 82. Component 83 refers to the ground electrode or bottom electrode of the transducer 81. Component 84 refers to the top electrode or electrode pattern which defines the acoustic beam of transducer 81. Cut or demarcation lines 85 separate transducer 81 into sections. Arrow 86 is the optical beam passing through the AO medium 82 to allow Acousto-Optic Interaction. Connection wires 87 electrically join the sections of transducer 81 in series.

FIG. 4a is a top view 90 of another prior art sectioning and series connection of an apodized transducer used to reduce side-lobes and ghost images in AO diffraction, and improve the transducer bandwidth. Piezoelectric transducer 91 is bonded to AO medium 92. Component 93 refers to the ground electrode or bottom electrode of the transducer 91. Component 94 refers to the top electrode or electrode pattern which defines the acoustic beam of transducer 91. Cut or demarcation lines 95 separate transducer 91 into sections. Arrow 96 is the optical beam passing through the AO medium 92 to allow Acousto-Optic Interaction. Connection wires 97 electrically join the sections of transducer 91 in series.

FIG. 4b is a top view 100 of another prior art sectioning and series connection of an apodized transducer used to reduce side-lobes and ghost images in AO diffraction, and improve the transducer bandwidth. Piezoelectric transducer 101 is bonded to AO medium 102. Component 103 refers to the ground electrode or bottom electrode of the transducer 101. Component 104 refers to the top electrode or electrode pattern which defines the acoustic beam of transducer 101. Cut or demarcation lines 105 separate transducer 101 into sections. Arrow 106 is the optical beam passing through the AO medium 102 to allow Acousto-Optic Interaction. Connection wires 107 electrically join the sections of transducer 101 in series.

FIG. 4c is a top view 110 of another prior art sectioning and series connection of an apodized transducer used to reduce side-lobes and ghost images in AO diffraction, and improve the transducer bandwidth. Piezoelectric transducer 111 is bonded to AO medium 112. Component 113 refers to the ground electrode or bottom electrode of the transducer 111. Component 114 refers to the top electrode or electrode pattern which defines the acoustic beam of transducer 111. Cut or demarcation lines 115 separate transducer 111 into sections. Arrow 116 is the optical beam passing through the AO medium 112 to allow Acousto-Optic Interaction. Connection wires 117 electrically join the sections of transducer 111 in series.

FIG. 5a is a top view 200 of a first diamond shaped apodized transducer sectioning according to the subject invention for reducing side-lobes and ghost images in AO diffraction, and improve the transducer bandwidth. Piezoelectric transducer 201 is bonded to AO medium 202. Component 203 refers to the ground electrode or bottom electrode of the transducer 201. Component 204 refers to the top electrode or electrode pattern which defines the acoustic beam of transducer 201. Cut or demarcation lines 205 separate transducer 201 into sections. Arrow 206 is the optical beam passing through the AO medium 202 to allow Acousto-Optic Interaction. Connection wires 207 electrically join the sections of transducer 201 in series. Label 208 refers to cut or demarcation lines at an oblique angle (θ) to separate transducer sections. Label 208' refers to another cut or demarcation lines at an oblique angle (θ') to separate transducer sections.

FIG. 5b is a top view 210 of a second truncated Gaussian shaped apodized transducer sectioning according to the subject invention for reducing side-lobes and ghost images in AO diffraction, and improve the transducer bandwidth. Piezoelectric transducer 21 is bonded to AO medium 212. Component 213 refers to the ground electrode or bottom electrode of the transducer 211. Component 214 refers to the top electrode or electrode pattern which defines the acoustic beam of transducer 211. Cut or demarcation lines 215 separate transducer 211 into sections. Arrow 216 is the optical beam passing through the AO medium 212 to allow Acousto-Optic Interaction. Connection wires 217 electrically join the sections of transducer 211 in series. Label 218 refers to cut or demarcation lines at an oblique angle (θ) to separate transducer sections. Label 218' refers to another cut or demarcation lines at an oblique angle (θ') to separate transducer sections.

FIG. 5c is a top view 220 of a third Cosine shaped apodized transducer sectioning according to the subject invention for reducing side-lobes and ghost images in AO diffraction, and improve the transducer bandwidth. Piezoelectric transducer 221 is bonded to AO medium 222. Component 223 refers to the ground electrode or bottom electrode of the transducer 221. Component 224 refers to the top electrode or electrode pattern which defines the acoustic beam of transducer 221. Cut or demarcation lines 225 separate transducer 221 into sections. Arrow 226 is the optical beam passing through the AO medium 222 to allow Acousto-Optic Interaction. Connection wires 227 electrically join the sections of transducer 221 in series. Label 228 refers to cut or demarcation lines at an oblique angle (θ) to separate transducer sections. Label 228' refers to another cut or demarcation lines at an oblique angle (θ') to separate transducer sections.

Referring to FIGS. 5a–5c, respective piezoelectric transducers 201, 211, 221 are bonded to an AOTF or other respective acousto-optic device material bodies 202, 212, 222 with respective ground electrodes 203(FIG. 5a), 213 (FIG. 5b), 223(FIG. 5c) consisting of several thin metallic layers and serving as a bonding mechanism between the respective material bodies 202, 212, 222 and piezoelectric transducers 201, 211, 221. The transducer's active area is defined by the top electrode pattern 204(FIG. 5a), which for the preferred embodiment 200 is selected to have a diamond shape. The transducer's active area is defined by the top electrode pattern 214(FIG. 5b), which for the preferred embodiment 210 is selected to have a truncated Gaussian shape. The transducer's active area is defined by the top electrode pattern 224(FIG. 5c) which for the preferred embodiment 220 is selected to have cosine shape.

Referring to FIGS. 5a–c, the orientation of transducer demarcation or cuts relative to their respective optical beams are shown for three apodizations considered here. The apodized transducer is sectioned with two oblique demarcations or cuts 208, 208'(FIG. 5a), 218, 218'(FIG. 5b), 228, 228'(FIG. 5c) having oblique angles (θ) and (θ'), while in the prior art cases as shown in FIGS. 3a–c and 4a–c the demarcations or cuts are normal to the AO interaction plane. The oblique angle (θ) and (θ') refers to the angle between the demarcation/cut line and normal to the interaction plane.

In each of FIGS 5a–5c, two demarcations or cuts are made to obtain four sections for the transducer 1. In each of FIGS. 5a–5c, the transducer sections are series connected with wiring 207, 217, 227, respectively, to increase the transducer impedance for better matching to the generator and to improve the transducer RF bandwidth.

The oblique sectioning 208, 208'(FIG. 5a), 218, 218'(FIG. 5b), 228, 228'(FIG. 5c) allows for sufficiently large ground areas for each section to ease electrical connections and results in less area mismatch for each section with displacement error of the demarcation or cut from the ideal position. Furthermore, the required number of demarcations or cuts in the preferred embodiment as shown in FIGS 5a–5c are less than the number required for the prior art of FIGS. 3a–c and 4a–c for the same number of sections. All these advantages offered by the preferred embodiment add in lowering the cost of manufacturing the AO devices and particularly the AOTFs.

For series connection of oblique sections it is necessary that the area of each section is equal. If not then the acoustic energy will not be distributed evenly. To keep the area of each section equal the demarcations or cuts must be at certain angles. For a diamond shaped apodization the demarcation or cut lines must pass at midway of each side of the diamond for symmetrical sections. It is possible to select one demarcation or cut with any selected oblique angle between 5 to 85 degrees to the AO interaction plane and then compute the oblique angle for the other demarcation or cut to make each section of equal area.

The main advantage of the preferred embodiment as shown in FIGS. 5a–c having oblique cuts 208, 208'(FIG. 5a), 218, 218'(FIG. 5b), 228, 228'(FIG. 5c) is that no side-lobes and ghost images are generated due to the discontinuity in the acoustic field caused by the presence of cuts. In other approaches such as those shown in FIGS. 4a–c when the cuts on the AO device transducer are oriented nearly perpendicular to the AO interaction plane, side-lobes and hence ghost images appear. In AOTF based imaging systems ghost images and image blurring results due to the transducer sectioning cuts oriented near normal to the AO interaction plane. A line discontinuity in the acoustic field so oriented produces wave vectors in the AO interaction plane. These wave vectors may Bragg match at optical wavelength away from the optical passband or selected wavelength. The angle of diffraction for light at a given acoustic frequency is proportional to optical wavelength. Therefore, light diffracted from the wave vectors resulting from the discontinuity of cuts produce images displaced from the selected optical pass band image. The displaced image appears like ghosts to a viewer. If the cuts are made oblique i. e. at angle other than the normal to the AO interaction plane then acoustic field due to discontinuity has the wave vectors out of the AO interaction plane. Bragg mismatch for the out of interaction plane wave vectors is large with negligible light diffraction occurring due to discontinuity from the cuts. Thus the ghost images are absent with oblique cuts as in preferred embodiment shown in FIGS. 5a–c.

FIG. 6 is a photograph of an Air Force test resolution chart obtained through AOTF constructed according to the prior art. Notice strong ghost images for the prior art.

Figure 7:
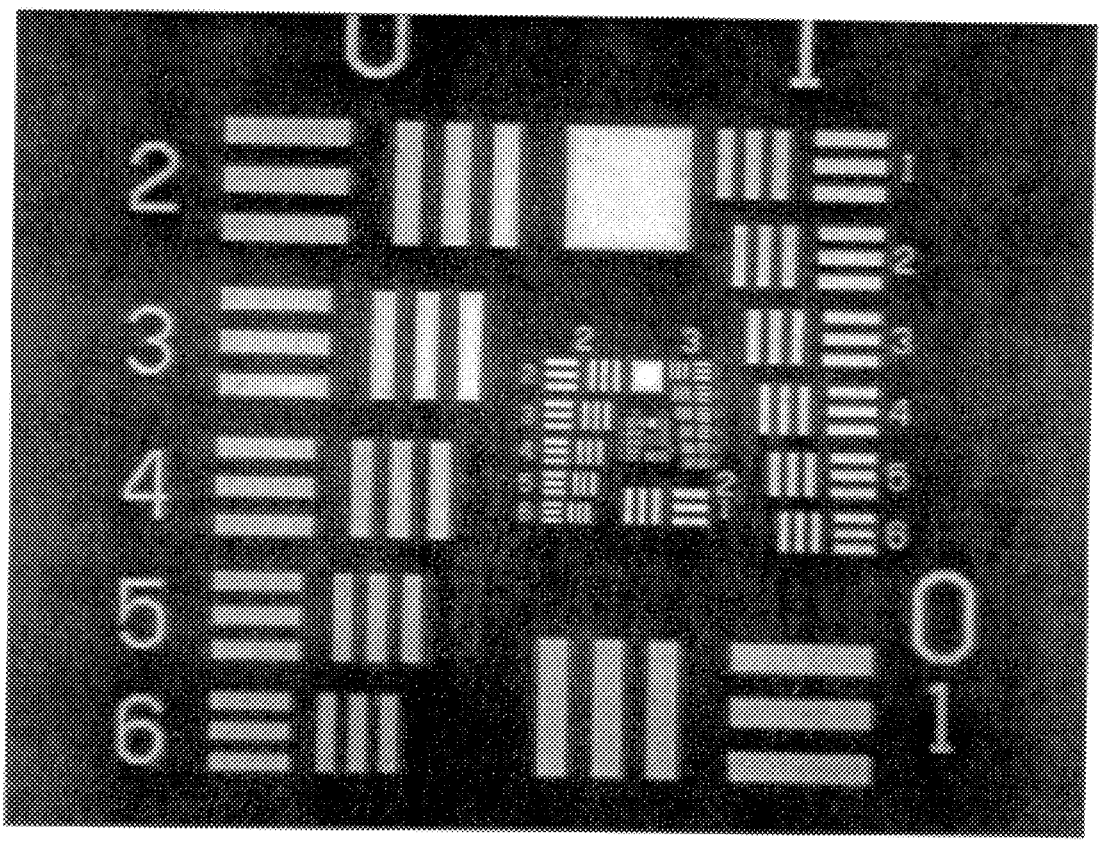
FIG. 7 shows an image of an Air Force test resolution chart with AOTFs with diamond shaped transducer sectioned and series connected according to FIG. 5a. Notice an absence of ghost images.

FIG. 7 is a photo graph of an Air Force test resolution chart obtained through AOTF constructed according to the subject invention disclosed in FIG. 5a. Notice only weak ghost images for this subject invention case. Weak and absence ghost images allows for better definition and resolution of the images which is crucial in pattern recognition, surveillance and the like.

Figure 8:
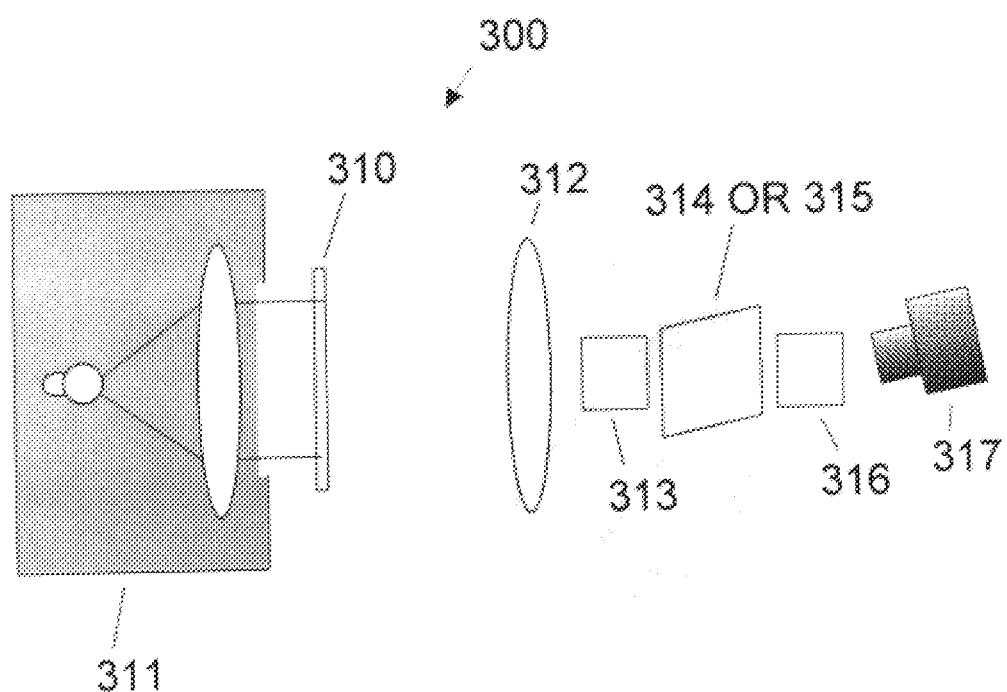
FIG. 8 shows the set-up to generate Air Force test resolution chart images in FIG. 6 and 7.

FIG. 8 is the set-up 300 used to generate the photographs in FIGS. 6 and 7. Component 310 is the Air Force test resolution chart slide. 311 is a slide projector illuminator. Transform lens 312 transforms the object at far distance. 313 refers to the light polarizer. The AOTF 314 and 315 are constructed according to the prior art previously described. Light polarizer 316 is used to cross-out undiffracted light for CCD(Charge Coupled Device) camera 317.

FIGS. 6 and 7 are the actual photographs generated in a set-up 300 shown in FIG. 8. Referring to FIG. 8, an Air Force test resolution slide 310 was back illuminated with a slide projector 311, illuminator. A lens 312 was used to transform the target to far distance so that the incoming bundle of rays are within the conical acceptance angle of the AOTFs. A polarizer 313 was placed after the lens 312 to remove unwanted light polarized in the wrong direction of the AOTF. An AOTF 314 either with transducer cut according to FIGS. 4a or another AOTF 315 with transducer cuts according to FIGS. 5a was placed after the polarizer 313. An analyzer 316 was placed after the AOTF and a CCD(Charge Coupled Device) camera 317 was positioned to obtain the filtered image.

While the preferred embodiment describe electrode patterns, the invention can also be applicable with square, rectangular, circular, and elliptical, electrode patterns.

Many AO devices use transducer cuts or sectioning to match the transducer impedance to the driver for efficient energy transfer over a wide frequency band. AO devices such as Acousto-Optic Modulators (AOMs), Acousto-Optic Beam Deflectors (AOBDs), Bragg Cells (BCs), Acousto-Optic Tunable Filters (AOTFs), Acousto-Optic Frequency Shifters (AOFSs) and Acoust-Optic Correlators (AOCs) to name a will benefit with oblique cuts in place of cuts oriented nearly normal to the optical beam propagation direction. AO devices with transducer having oblique demarcations or cuts will exhibit superior ghost suppression and side-lobe suppression performance in comparison to the demarcations or cuts oriented in direction normal to AO interaction plane. Moreover, it is easier to manufacture these AO devices with oblique cuts due to better grounding areas, more efficient use of materials, improved manufacturing tolerances and reduce labor in producing sections.

For each AO device mentioned above we list specific improvement that occur when oblique cuts are substituted in place of the prior art cuts for sectioning the transducer. In AOM the oblique cuts will reduce the beam distortion. In AOBD the oblique cuts will reduce side-lobes at the focus thereby increasing the number of resolvable spots. Similar to AOBD, reduced side-lobes will improve the frequency resolution in BC. Side-lobes and ghost images will be suppressed in AOTF. Beam distortion will be reduced in AOFS and in case of AOC the correlation bandwidth will be sharper and the correlation peak will have reduced side-lobes.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. An Acousto-optic(AO) device having a transducer comprising:

a sectioned piezoelectric transducer with a side passing optical beam forming an acousto-optic interaction plane;

an upper electrode pattern on the transducer, the upper electrode pattern being chosen from one of: a diamond, a truncated Gaussian, a Cosine, a circle and an elliptical shape;

a bottom electrode layer on the transducer beneath the upper electrode pattern; and a demarcation cut at an oblique angle in the upper electrode pattern and through the bottom electrode layer, the demarcation cut being not normal to the acousto-optic interaction plane, the demarcation cut forming equal sized sections of the transducer; and means for connecting each of the equal sized sections of the transducer in series, wherein the oblique demarcation cut reduces side-lobes and ghost in an acoustic field generated by the transducer.

2. The Acousto-optic(AO) device of claim 1, wherein the oblique angle includes:

an angle oriented between approximately 5 to approximately 85 degrees with respect to the normal to the acousto-optic interaction plane.

3. The Acousto-optic(AO) device of claim 1, wherein the oblique demarcation cut includes:

two oblique angle demarcation cuts which form four equal sections in the electrode pattern.

4. The Acousto-optic(AO) device of claim 3, wherein the oblique angles each include:

an angle oriented between approximately 5 to approximately 85 degrees with respect to the normal to the acousto-optic interaction plane.

5. The Acousto-optic(AO) device of claim 1, wherein the transducer pattern includes:

an apodized overall transducer pattern.

6. The Acousto-optic(AO) device of claim 1, wherein the transducer includes:

Acousto-Optic Modulators (AOMs).

7. The Acousto-optic(AO) device of claim 1, wherein the transducer includes:

Acousto-Optic Beam Deflectors (AOBDs).

8. The Acousto-optic(AO) device of claim 1, wherein the transducer includes:

Bragg Cells (BCs).

9. The Acousto-optic(AO) device of claim 1, wherein the transducer includes:

Acousto-Optic Tunable Filters (AOTFs).

10. The Acousto-optic(AO) device of claim 1, wherein the transducer includes:

Acousto-Optic Frequency Shifters (AOFSs).

11. The Acousto-optic(AO) device of claim 1, wherein the transducer includes:

Acoust-Optic Correlators (AOCs).

12. An Acousto-optic(AO) device having a transducer comprising:

a sectioned piezoelectric transducer with a side passing optical beam forming an acousto-optic interaction plane;

a diamond shape apodized upper electrode pattern on the transducer;

a bottom electrode layer on the transducer beneath the upper electrode pattern;

two demarcation cuts each at an oblique angle in the upper electrode pattern and through the bottom electrode layer, each demarcation cut being not normal to the acousto-optic interaction plane, the demarcation cuts forming four equal sections in the transducer; and means for connecting each of the equal sized sections of the transducer in series, each of the oblique angles are oriented between approximately 5 to 85 degrees with respect to the normal to the acousto-optic interaction plane, wherein the oblique demarcation cuts reduce side-lobes and ghost in an acoustic field generated by the transducer.

13. An Acousto-optic(AO) device having a transducer comprising:

a sectioned piezoelectric transducer with a side passing optical beam forming an acousto-optic interaction plane;

a truncated Gaussian shape apodized upper electrode pattern on the transducer;

a bottom electrode layer on the transducer beneath the upper electrode pattern;

two demarcation cuts each at an oblique angle in the upper electrode pattern and through the bottom electrode layer, each demarcation cut being not normal to the acousto-optic interaction plane, the demarcation cuts forming four equal sections in the transducer; and means for connecting each of the equal sized sections of the transducer in series, each of the oblique angles are oriented between approximately 5 to 85 degrees with respect to the normal to the acousto-optic interaction plane, wherein the oblique demarcation cuts reduce side-lobes and ghost in an acoustic field generated by the transducer.

* * * * *